(12) United States Patent
Brill et al.

(10) Patent No.: US 9,444,624 B2
(45) Date of Patent: Sep. 13, 2016

(54) PROVIDING USER AUTHENTICATION

(71) Applicant: Facebook, Inc., Menlo Park, CA (US)

(72) Inventors: Jacob Andrew Brill, San Francisco, CA (US); Daniel Gregory Muriello, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 163 days.

(21) Appl. No.: 13/668,083

(22) Filed: Nov. 2, 2012

(65) Prior Publication Data

US 2014/0129834 A1    May 8, 2014

(51) Int. Cl.
*H04L 29/06*    (2006.01)
*H04L 9/32*    (2006.01)

(52) U.S. Cl.
CPC ............ *H04L 9/321* (2013.01); *H04L 9/3226* (2013.01)

(58) Field of Classification Search
None
See application file for complete search history.

(56) References Cited

U.S. PATENT DOCUMENTS

| | | | |
|---|---|---|---|
| 6,229,806 B1 * | 5/2001 | Lockhart et al. | 370/389 |
| 6,799,277 B2 * | 9/2004 | Colvin | G06F 21/121 705/51 |
| 6,834,347 B2 * | 12/2004 | Goodman et al. | 713/191 |
| 6,944,296 B1 * | 9/2005 | Liu | H04N 21/2347 380/201 |
| 7,373,515 B2 * | 5/2008 | Owen et al. | 713/182 |
| 7,404,202 B2 * | 7/2008 | Hamilton et al. | 726/5 |
| 7,835,993 B2 * | 11/2010 | Okamoto | G06F 21/10 380/278 |
| 8,402,555 B2 * | 3/2013 | Grecia | H04L 9/3234 713/185 |
| 8,635,456 B2 * | 1/2014 | Fascenda | 713/171 |
| 2003/0097571 A1 * | 5/2003 | Hamilton et al. | 713/182 |
| 2005/0102509 A1 * | 5/2005 | Fascenda | 713/165 |
| 2005/0120866 A1 * | 6/2005 | Brinkman et al. | 84/609 |
| 2008/0005033 A1 * | 1/2008 | Clark | G06F 21/73 705/59 |
| 2008/0092239 A1 * | 4/2008 | Sitrick | G06F 21/10 726/27 |
| 2010/0040233 A1 * | 2/2010 | Ganapathy | 380/277 |
| 2010/0043056 A1 * | 2/2010 | Ganapathy | 726/2 |
| 2012/0131354 A1 * | 5/2012 | French | 713/189 |
| 2012/0144203 A1 * | 6/2012 | Albisu | 713/184 |
| 2013/0081114 A1 * | 3/2013 | Bell et al. | 726/5 |

* cited by examiner

*Primary Examiner* — Christopher Revak
(74) *Attorney, Agent, or Firm* — Baker Botts L.L.P.

(57) ABSTRACT

In particular embodiments, a user associated with a user account wishes to utilize their computing device to facilitate authentication of their identity. The user may provide a device key to an online system hosting the user account, wherein the device key uniquely identifies their computing device. The device key may be based on a device identifier encoded in hardware of the computing device. The online system may then store the device key in association with the user account. Subsequently, if an action related to the online system requires authentication, the user may be asked to provide authentication using their computing device. The user generates an authentication code using their device, which can be entered by the user into a user interface for comparison against an authentication code generated using the device key stored by the online system.

20 Claims, 8 Drawing Sheets

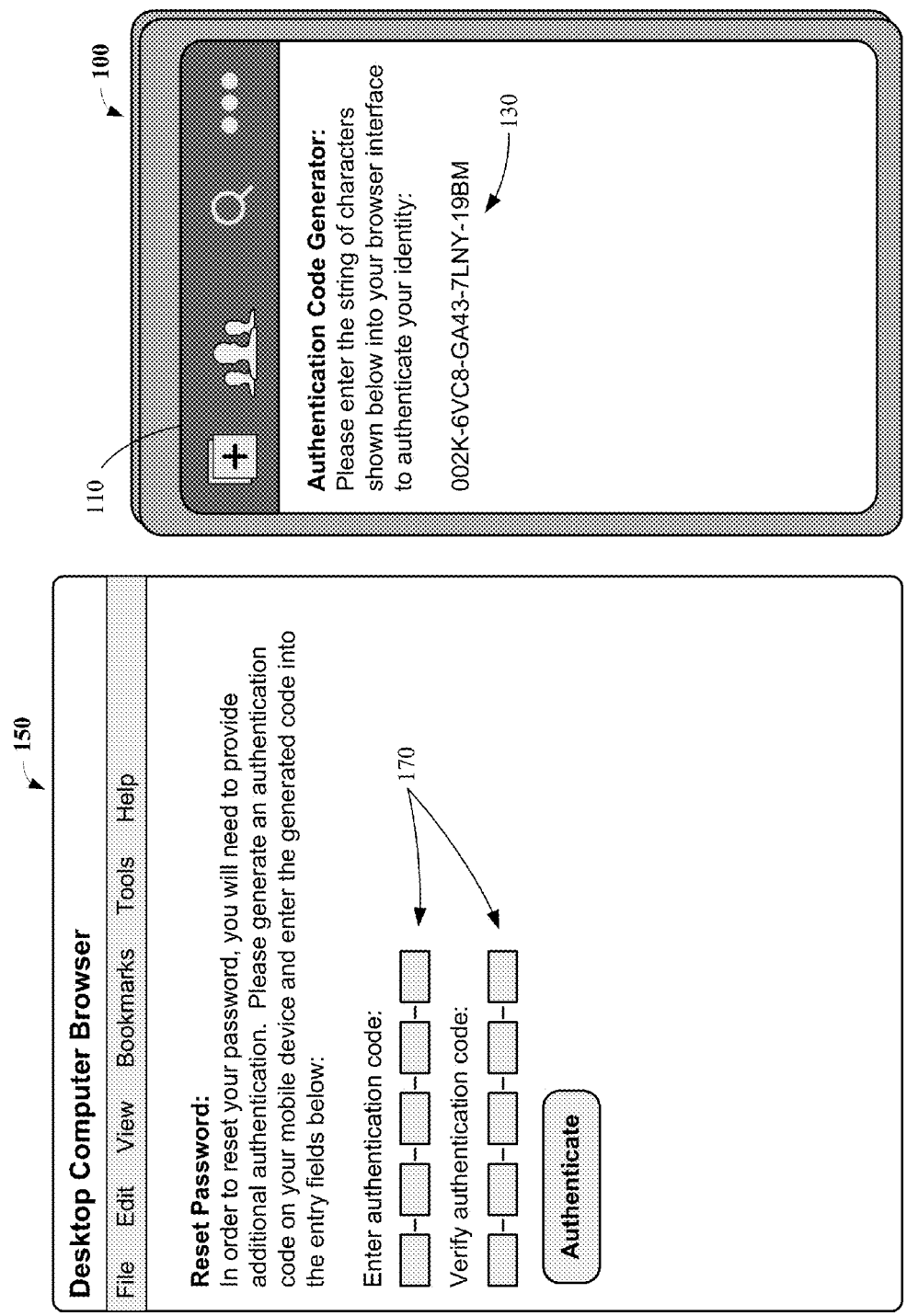

PROVIDING USER AUTHENTICATION

TECHNICAL FIELD

This disclosure generally relates to user authentication, in particular, user authentication in association with an identified device.

BACKGROUND

A mobile computing device—such as a smartphone, tablet computer, or laptop computer—may include functionality for determining its location, direction, or orientation, such as a GPS receiver, compass, or gyroscope. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

In particular embodiments, users associated with a personal computing device can use the personal computing device to authenticate their identity in association with an online system where the user has a user account. A device identifier may be imprinted on to a chip in the personal computing device. The identifier is provided to the online system to be associated with the user account. After that point, whenever the online system requires additional verification of the user's identity, the user can use their personal computing device to generate a code based on the device identifier and enter the code into an interface provided by the online system. The online system can then generate its own comparable code based on the device identifier, and then compare the code entered by the user to the generated code to see if they match. In particular embodiments, a third-party system may also be able to utilize this authentication functionality by requiring the user to enter the code and requesting a generated code from the online system. A disavowal process may also be provided in order to enable the user to disassociate their identity with the device identifier prior to selling, giving away, or otherwise disposing of the personal computing device.

BRIEF DESCRIPTION OF THE DRAWINGS

FIGS. 1C-D are wireframes showing examples of an interface for authenticating a user.

DESCRIPTION OF PARTICULAR EMBODIMENTS

FIGS. 1A-D are wireframes showing examples of a graphical user interface (GUI) for provisioning a device identifier from personal computing device to an online system and for authentication of a user using a code generated based on the device identifier. In particular embodiments, device 100 includes a display screen 110. In particular embodiments, device 100 may also include a chip imprinted or encoded with a device identifier. The user associated with device 100 may be a member of an online system including a plurality of user accounts, in which a profile for the user may be maintained in association with a user account. The online system may be capable of providing authentication functionality in conjunction with device 100. Device 100 may include software to generate authentication codes based upon the device identifier. Device 100 may also be able to connect to the online system by way of a communications network, such as a cell network or Wi-Fi. Particular embodiments of a network environment associated with an online system as described above are described in further detail in FIG. 5 and related text in the specification. As one of skill in the art would be aware, embodiments of the invention are not limited to the examples described in FIGS. 1A-D and may be performed in association with other types of computing devices as described in FIG. 6 and related text in the specification.

Figure 1B:
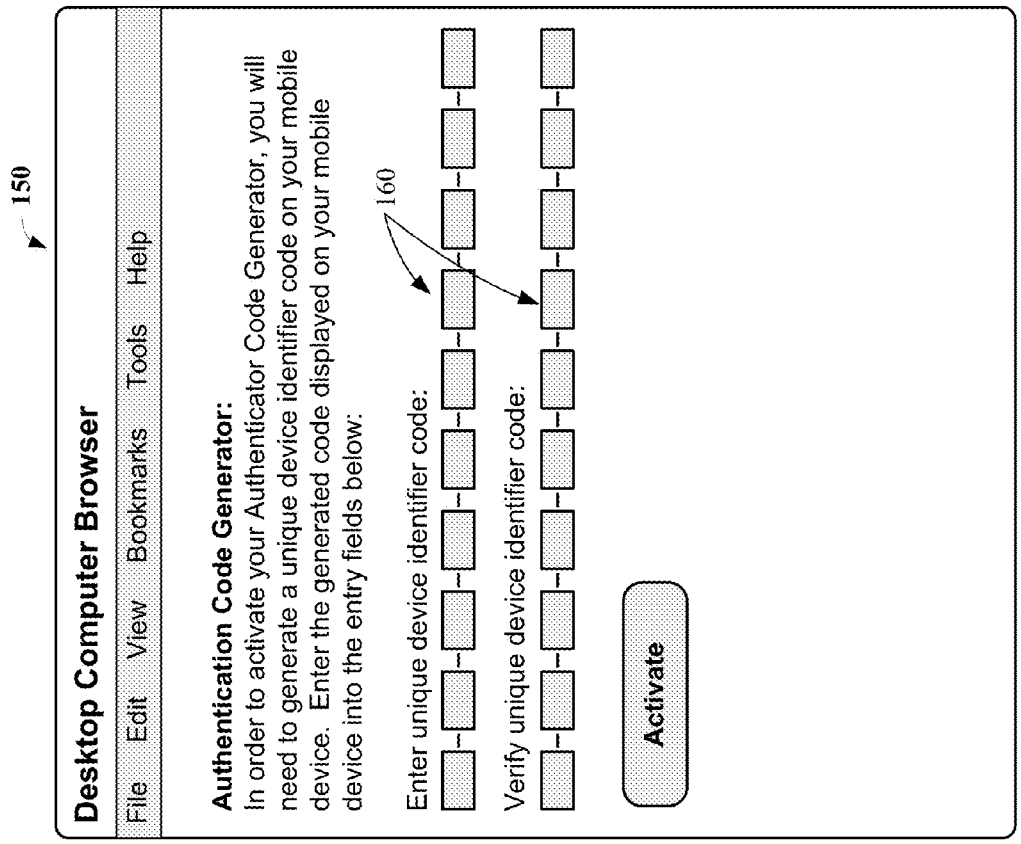
FIGS. 1A-B are wireframes showing examples of an interface for provisioning a device identifier.
Figure 1A:
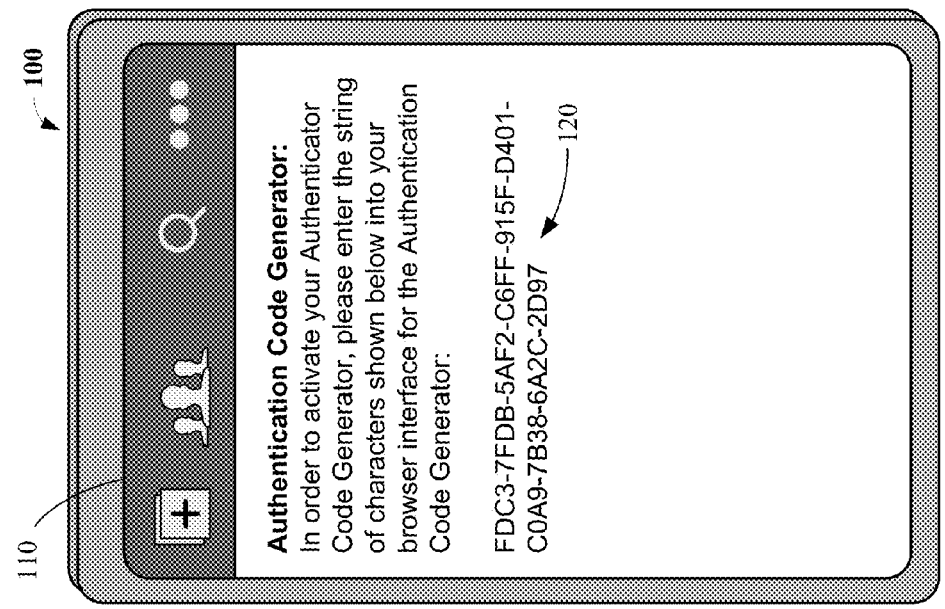

In the example wireframe in FIG. 1A, a user of device 100 has decided to utilize the Authentication Code Generator functionality so as to enable a higher level of security for actions taken with respect to an online system where the user has set up a user account. In order to use this functionality, the user must first associate device 100 with the user's account in the online system. Device 100 displays an interface on display screen 110 with instructions on how to do this. The device identifier 120 shown on display screen 110 may be the device identifier, or it may be a derivative generated by device 100, e.g., a cryptographic hash of the device identifier and the username and password associated with the user's user account.

In the example wireframe in FIG. 1B, a browser screen 150 is illustrated. Browser screen 150 may be displayed on another computing device, e.g., a desktop computer, of the user. Browser screen 150 displays a GUI including entry fields where the user can type in the device identifier once it is displayed on the screen 110 of device 100. In particular embodiments, once the user has entered the device identifier and clicked on the "Activate" button, the online system stores the device identifier in a user profile for the user account. In particular embodiments, no display or entry of the device identifier by the user into a browser may be necessary—all that may be required is to simply click a button or configure a setting in an interface displayed on device 100, at which point device 100 uploads the device identifier to the online system without further input by the user.

In the example wireframe in FIG. 1C, the user is attempting an action requiring heightened security, in this case, a password reset, while using the other computing device, e.g., a desktop computer, of the user. In browser screen 150, the "Reset Password" GUI is requiring the user to generate an authentication code on device 100 and enter the authentication code into entry fields 170. While the user is generating and entering the authentication code, online system uses the device identifier associated with the user to generate its own version of the authentication code, e.g., a hash of the device identifier and a timestamp.

In the example wireframe in FIG. 1D, the user utilizes the Authentication Code Generator program on device 100 to generate an authentication code 130 that is then displayed on screen 110 of device 100. Authentication code 130 is generated based on the device identifier stored on device 100 using the same method used by the online system. Once the user enters authentication code 130 into entry fields 170 and clicks the "Authenticate" button, the online system compares the authentication code it generated with the authentication code entered by the user into entry fields 170. If the two codes match, the user is deemed authenticated. In this manner, the user is afforded extra security against those who might attempt to access the user's account and perform certain actions.

Figure 2:
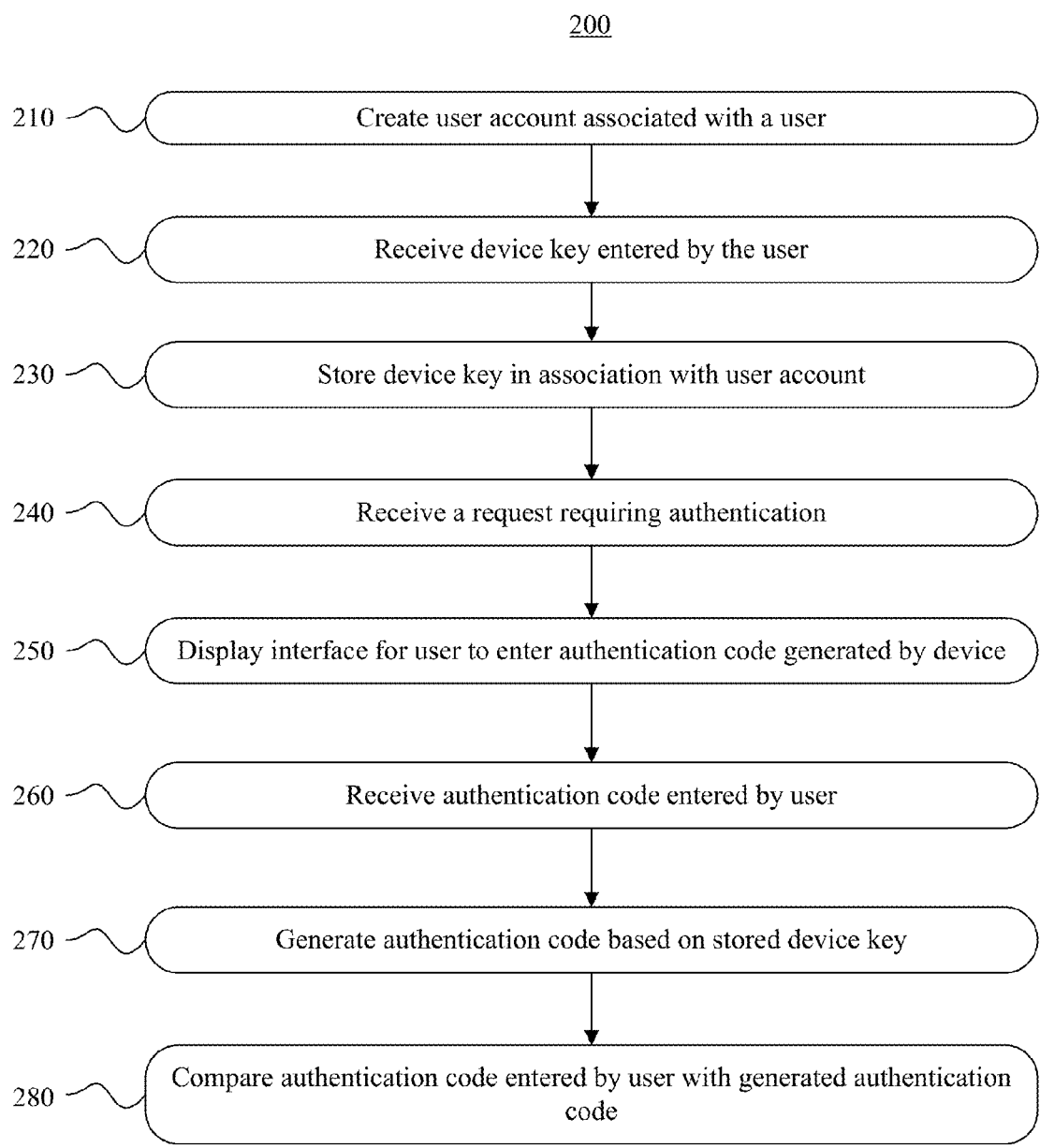
FIG. 2 is a flowchart of an example method according to particular embodiments.

The steps involved in providing authentication functionality based on user association with an identified device, as shown in FIG. 1, are described in further detail in FIG. 2 and related text in the specification.

FIG. 2 is a flowchart of an example method for provisioning a device identifier from personal computing device to an online system and for authentication of a user using a code generated based on the device identifier.

In step 210, a user account for the user is created in the online system. In particular embodiments, the user account may be associated with user profile information. In particular embodiments, the user may begin using a device on which authentication code generating functionality may be available.

In step 220, the online system receives a device key—this device key may be the device identifier, or it may be a derivative generated by the device, e.g., a cryptographic hash of the device identifier and the username and password associated with the user's user account. Any conventional technique for generating such a derivative of the device identifier may be utilized, such as, for example and without limitation, using a cryptographic hash algorithm (e.g., SHA-1, SHA-2, MD5, HAVAL, RadioGatún, RIPEMD-160, SWIFFT, Tiger2, Whirlpool, VSH). This device key may be entered by the user, e.g., by typing it into a GUI provided in a browser or other application or otherwise entering it into a user interface, or sent directly by the device associated with the user. In particular embodiments, the device may first attempt to send the device key directly to the online system and only require the user to enter the device key manually if the device does not have sufficient network connectivity, or if the online system fails to send back an acknowledgment that it was received. In particular embodiments, when the user is entering the device key manually into an interface provided using a browser or other application, the interface may have required the user to enter the authentication code twice as a safeguard against error. In particular embodiments, the online system may require the user to wait until the device has sufficient network connectivity to send the device key directly to the online system.

In step 230, the online system stores the device key in association with the user account of the user for use in future situations requiring additional authentication. The device key may be stored as a part of the user's profile information. In particular embodiments, where the device key is based on the device identifier and also other elements, such as the user's username, password, or other personal information, whenever the user updates one or more of the other elements, the user may be required to re-generate the device key and update the version stored on the online system.

In step 240, the online system receives a request via the user's browser or other application to take an action requiring authentication. In particular embodiments, authentication may be required for such an action by default, or based on a context of the action (e.g., requesting a password reset after multiple recent unsuccessful attempts to log in), or based on configuration settings configured by the user. In particular embodiments, where third-party access is provided for authentication functionality, the request may have been received at a third-party system.

In step 250, the online server displays an interface in the user's browser or other application for the user to enter an authentication code generated by their device, which is based on the device key. In the context of third-party access, either the third-party system may provide the interface for the user to enter the authentication code, or the third-party system may enable display of an interface by the online server (e.g., in a pop-up window or in an iframe). At this point, the device user uses their device to generate an authentication code, and enters it into the interface. In particular embodiments, the authentication code may be a derivative of the device key, such as, for example and without limitation, a cryptographic hash of the device key and a truncated timestamp. In particular embodiments, the interface provided by the online server may enable entry of the authentication code from the device in a more automated fashion, such as scanning an image of a QR code displayed on the screen of the device and captured by a webcam.

In step 260, the online server receives the authentication code entered by the device user using the interface. In particular embodiments, rather than providing an interface for the user to enter the authentication code, the online server may request that the user transmit the authentication code generated by the device to the online server directly from the device if sufficient network connectivity exists for the device. For example, the online server may instruct the user to utilize an interface on the device, which may enable to user to click a button or otherwise indicate that an authentication code should be sent directly to the online server. For example, the user may open an authentication code generator application on the device, from which the user can simply click a button to transmit an authentication code, or, in more secure versions of this interface, in order to transmit the authentication code, the user may be required to enter a password, perform a swipe gesture in a particular pattern, provide biometric identification, etc.

In step 270, the online server generates its own version of the authentication code based on the device key. In particular embodiments, the method used by the online server is the same as the method used by the device to generate its version of the authentication code.

In step 280, the online server compares the authentication code entered by the user with the authentication code generated by the online server. If the two codes match, the user is deemed authenticated. If the two authentication codes fail to match, the user may be asked to generate a new authentication code, and the online server will generate a new authentication code, and the two new authentication codes will be compared. In the example provided above, where the authentication code is based on a hash incorporating a truncated timestamp, this technique enables generation of authentication codes that expire within a set period of time corresponding to the truncated timestamp (e.g., every one minute, or every hour). For this reason, it may be more common that the two authentication codes fail to match—because either the user-generated authentication code or the system-generated authentication code expired prior to comparison.

A disavowal process may also be provided in order to enable the user to disassociate their identity with the device identifier prior to selling, giving away, or otherwise disposing of the computing device. When the user provides an indication that they wish to disavow their association with the computing device, one example of the disavowal process may comprise deleting the device key and any authentication codes based on the device key from the online server, as well as from the computing device itself. In particular embodiments, the user may be required to enter a confirmation of such an action (e.g., by entering their password). In particular embodiments, the user may also "log out" of the computing device and thereby disavow their association with the computing device. In particular embodiments, such a disavowal may be reversible for a predetermined period of time after taking such an action, in order to prevent the scenario where such action was taken in error.

Figure 3A:
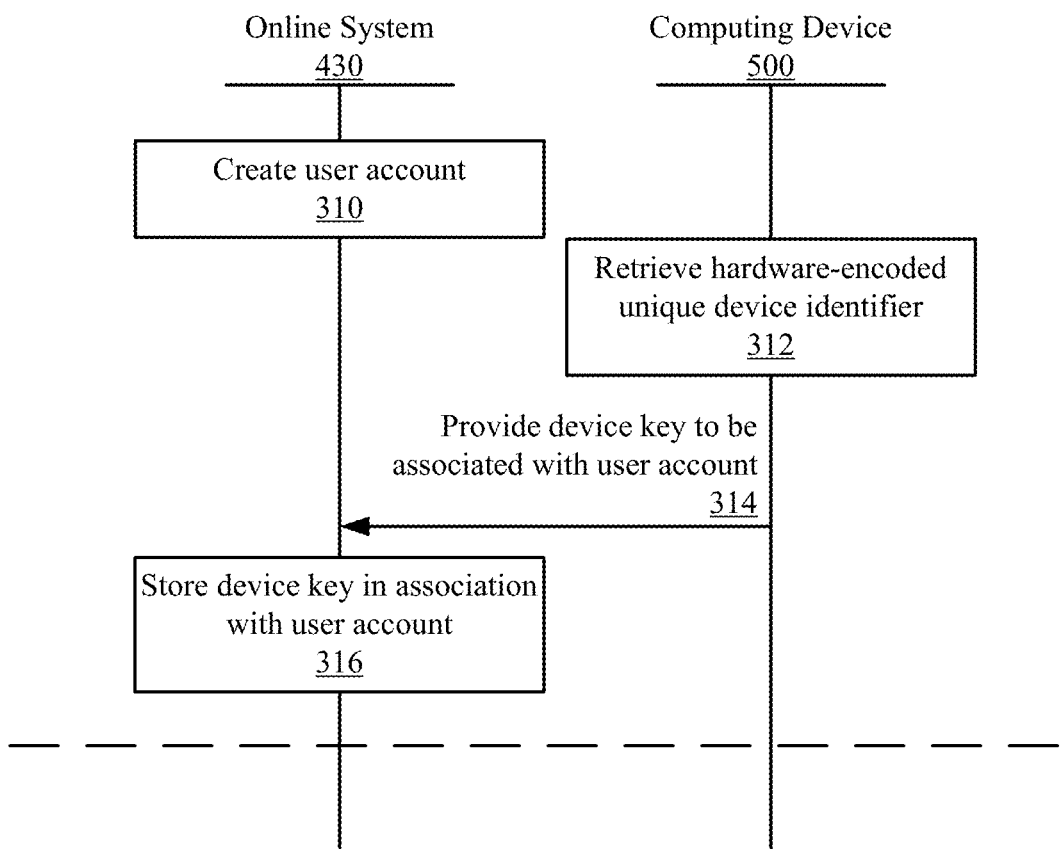
FIGS. 3A-C are interaction diagrams of processes according to particular embodiments.

FIG. 3A is an interaction diagram of an example process for associating a device identifier encoded in a computing device 500 with a user account in an online system 430. As a first step, a user account is created 310 in the online system for a user of computing device 500. Either upon initial setup, login, activation of the authentication functionality, or any other logical occasion, computing device 500 will be required to provide a device key. Computing device 500 may then retrieve a hardware-encoded device identifier 312—the device key provided by computing device 500 may be the device identifier itself, or it may be a derivative thereof. Computing device 500 then provides the device key to online system 430 to be associated with the user account 314. This may be accomplished either by automatic upload by computing device 500, or by manual entry by the user into a browser or other application interface. Online system 430 then stores the device key in association with the user account 316, possibly as part of a set of user profile information maintained for the user account. Once these steps are complete, computing device 500 is deemed to be associated with the user account and thereby provisioned to the online system for use in authentication procedures.

Figure 3B:
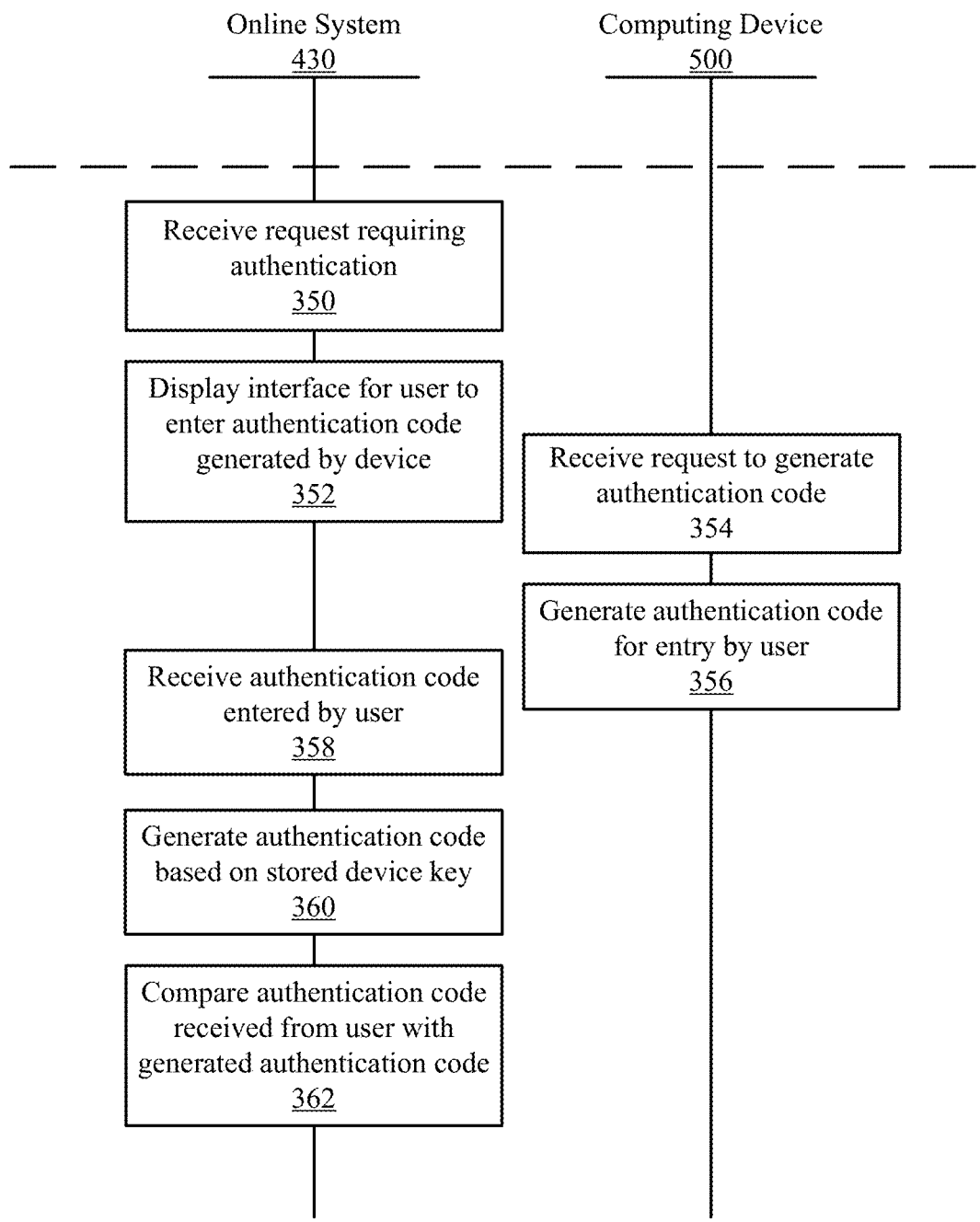

FIG. 3B is an interaction diagram of an example process for authentication of a user using authentication codes generated based on the device identifier. Once computing device 500 has been provisioned to online system 430, online system 430 may receive a request requiring authentication 350, such as, for example and without limitation, a password reset, an update of a username or password associated with the user account, an update of a credit card number or other financial information, an update of a social security number or driver's license number or other uniquely-identifying information, a purchase, a registration, or any other action deemed to require authentication. Online system 430 may then display an interface 352 in a browser or other application for the user to enter an authentication code generated by computing device 500. At this point, the user may access the authentication code generator functionality on computing device 500 to request an authentication code 354. Computing device 500 generates an authentication code 356 and displays or otherwise provides it to the user so that the user can enter it into the interface. Once online system 430 receives the authentication code 358 entered by the user, or, alternatively, while online system 430 is waiting to receive the authentication code entered by the user, online system 430 generates its own version of the authentication code 360 based on the device key stored in the online system in association with the user account. Online system 360 then compares 362 the authentication code entered by the user with the authentication code generated by the online system 360 in order to determine whether the user can be deemed authenticated.

Figure 3C:
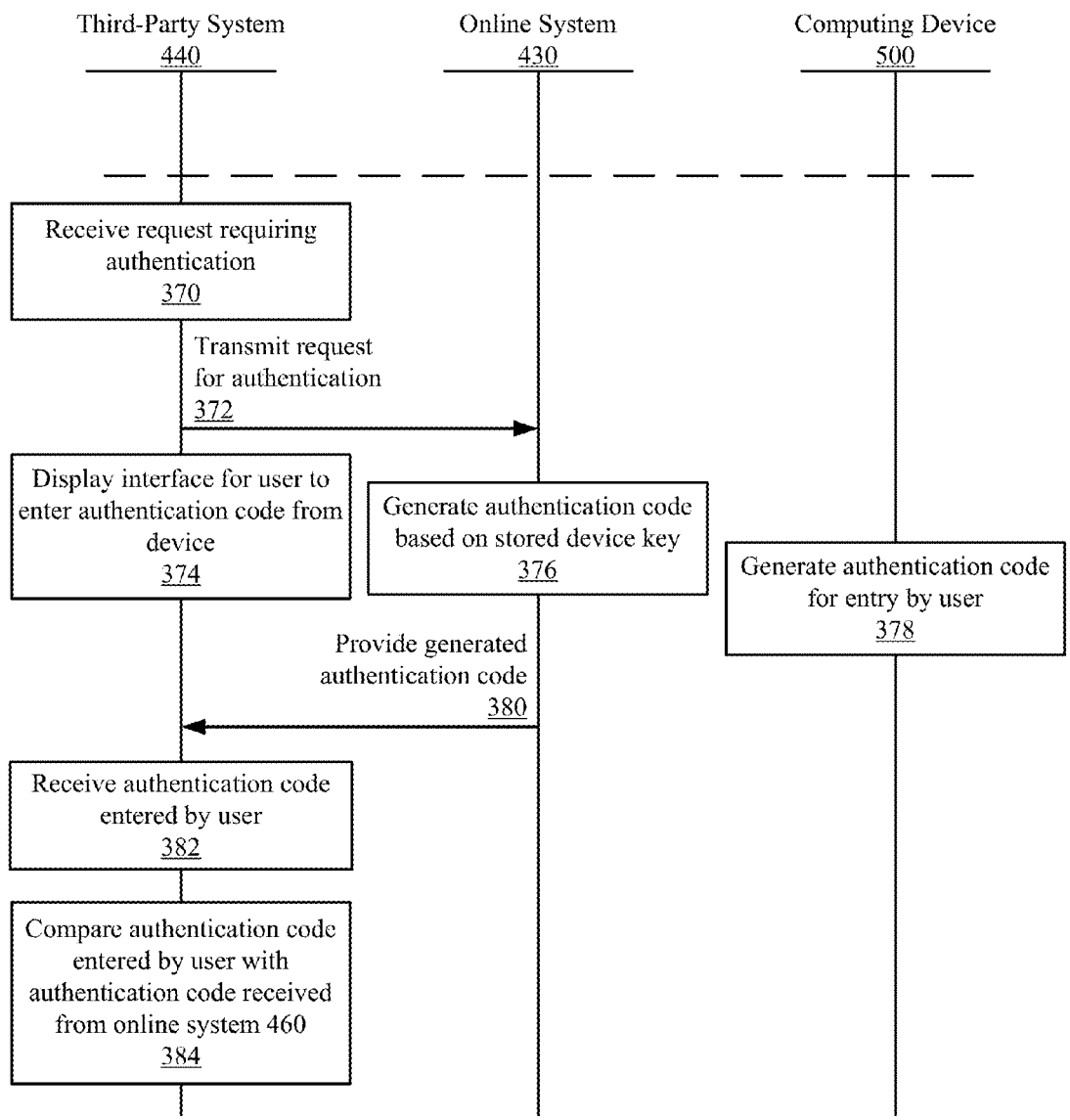

FIG. 3C is an interaction diagram of an example process for authentication of a user by a third-party system using authentication codes generated based on the device identifier. Third-party system 440 may receive a request requiring authentication 370. Third-party system 440 may then send a request 372 to online system 430 for an authentication code generated by online system 430. The request may include an identifier for the user, such as, for example and without limitation, a userID, an email address, a phone number, etc. Third-party system 440 may also display an interface 374 in a browser or other application for the user to enter an authentication code generated by computing device 500. This interface may be provided by third-party system 440, or third-party system 440 may enable display of an interface provided by online system 430 (e.g., using a pop-up window or an iframe).

In the meantime, online system 430 generates its own version of the authentication code 376 based on the device key stored in the online system in association with the user account. At this point, the user may access the authentication code generator functionality on computing device 500 to generate an authentication code 378 and enter it into the interface. Once online system 430 provides its generated authentication code 380 to third-party system 440, and third-party system 440 receives then authentication code entered by the user 382, third-party system 440 then compares 384 the user-entered authentication code with the system-generated authentication code in order to determine whether the user can be deemed authenticated.

In particular embodiments, an application programming interface (API) or other third-party interface may be provided in order to enable third-party system 440 to access the authentication functionality.

Figure 4:
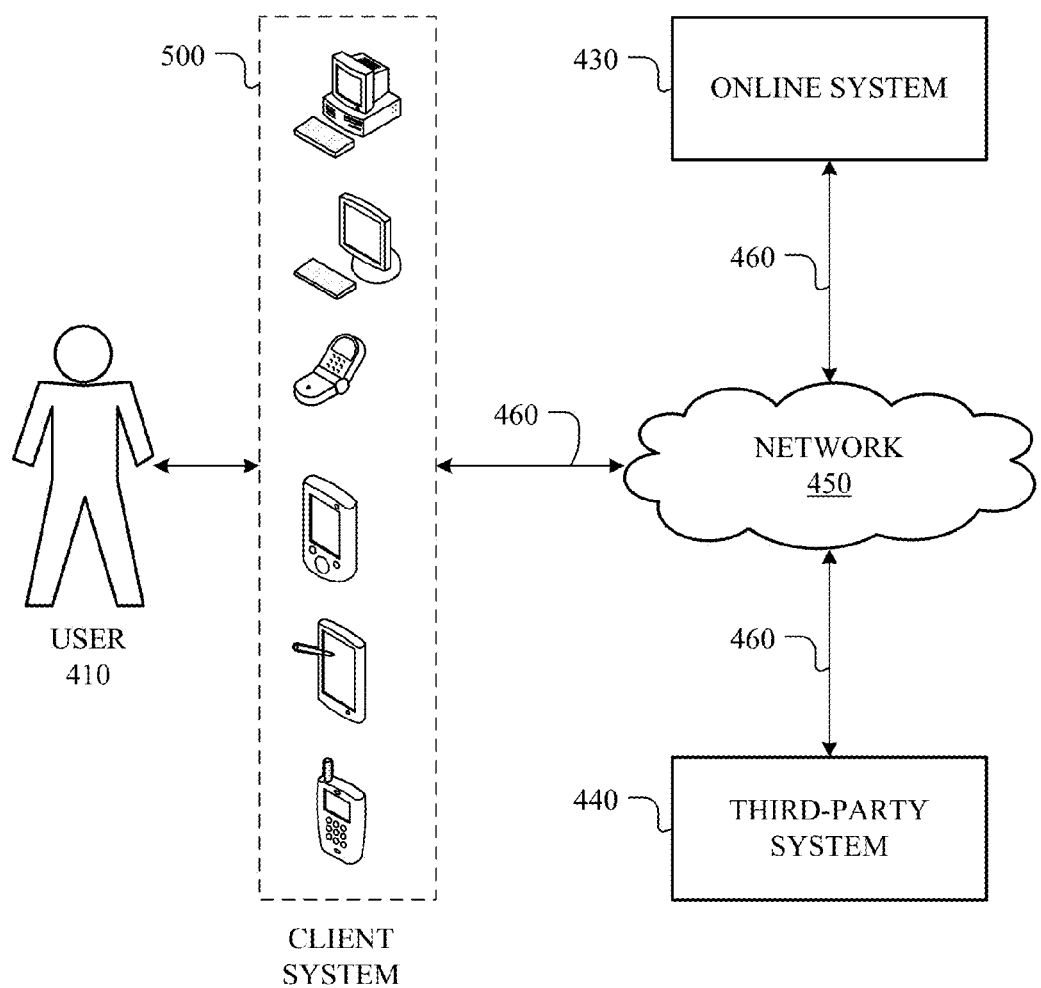
FIG. 4 is a block diagram of an example network environment.

FIG. 4 illustrates an example network environment 400. Network environment 400 may include a user 410, a client system 500, an online system 430, and a third-party system 440 connected to each other by a network 450. Although FIG. 4 illustrates a particular arrangement of user 410, client system 500, online system 430, third-party system 440, and network 450, this disclosure contemplates any suitable arrangement of user 410, client system 500, online system 430, third-party system 440, and network 450. As an example and not by way of limitation, two or more of client system 500, online system 430, and third-party system 440 may be connected to each other directly, bypassing network 450. As another example, two or more of client system 500, online system 430, and third-party system 440 may be physically or logically co-located with each other in whole or in part. Moreover, although FIG. 4 illustrates a particular number of users 410, client systems 500, online systems 430, third-party systems 440, and networks 450, this disclosure contemplates any suitable number of users 410, client systems 500, online systems 430, third-party systems 440, and networks 450. As an example and not by way of limitation, network environment 400 may include multiple users 410, client system 500, online systems 430, third-party systems 440, and networks 450.

In particular embodiments, user 410 may be an individual (human user), an entity (e.g., an enterprise, business, or third-party application), or a group (e.g., of individuals or entities) that interacts or communicates with or over online system 430. In particular embodiments, online system 430 may be a network-addressable computing system hosting applications. Online system 430 may generate, store, receive, and transmit user-associated data, such as, for example, user-profile data, concept-profile data, social-graph information, or other suitable data related to the online system. Online system 430 may be accessed by the other components of network environment 400 either directly or via network 450. In particular embodiments, online system 430 may include an authorization server that allows users 410 to opt in or opt out of having their actions logged by online system 430 or shared with other systems (e.g., third-party systems 440), such as, for example, by setting appropriate privacy settings. In particular embodiments, third-party system 440 may be a network-addressable computing system that can host third-party content objects and serve content, and/or provide a third-party advertisement serving engine. Third-party system 440 may generate, store, receive, and transmit third-party content and/or sponsored content, such as, for example, advertisements, incentive program notifications, coupons, etc. Third-party system 440 may be accessed by the other components of network environment 400 either directly or via network 450. In particular embodiments, one or more users 410 may use one or more client systems 500 to access, send data to, and receive data from online system 430 or third-party system 440. Client system 500 may access online system 430 or third-party system 440 directly, via network 450, or via a third-party system. As an example and not by way of limitation, client system 500 may access third-party system 440 via online system 430. Client system 500 may be any suitable computing device, such as, for example, a personal computer, a laptop computer, a cellular telephone, a smartphone, or a tablet computer.

This disclosure contemplates any suitable network 450. As an example and not by way of limitation, one or more portions of network 450 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 450 may include one or more networks 450.

Links 460 may connect client system 500, online system 430, and third-party system 440 to communication network 450 or to each other. This disclosure contemplates any suitable links 460. In particular embodiments, one or more links 460 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 460 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 460, or a combination of two or more such links 460. Links 460 need not necessarily be the same throughout network environment 400. One or more first links 460 may differ in one or more respects from one or more second links 460.

Figure 5:
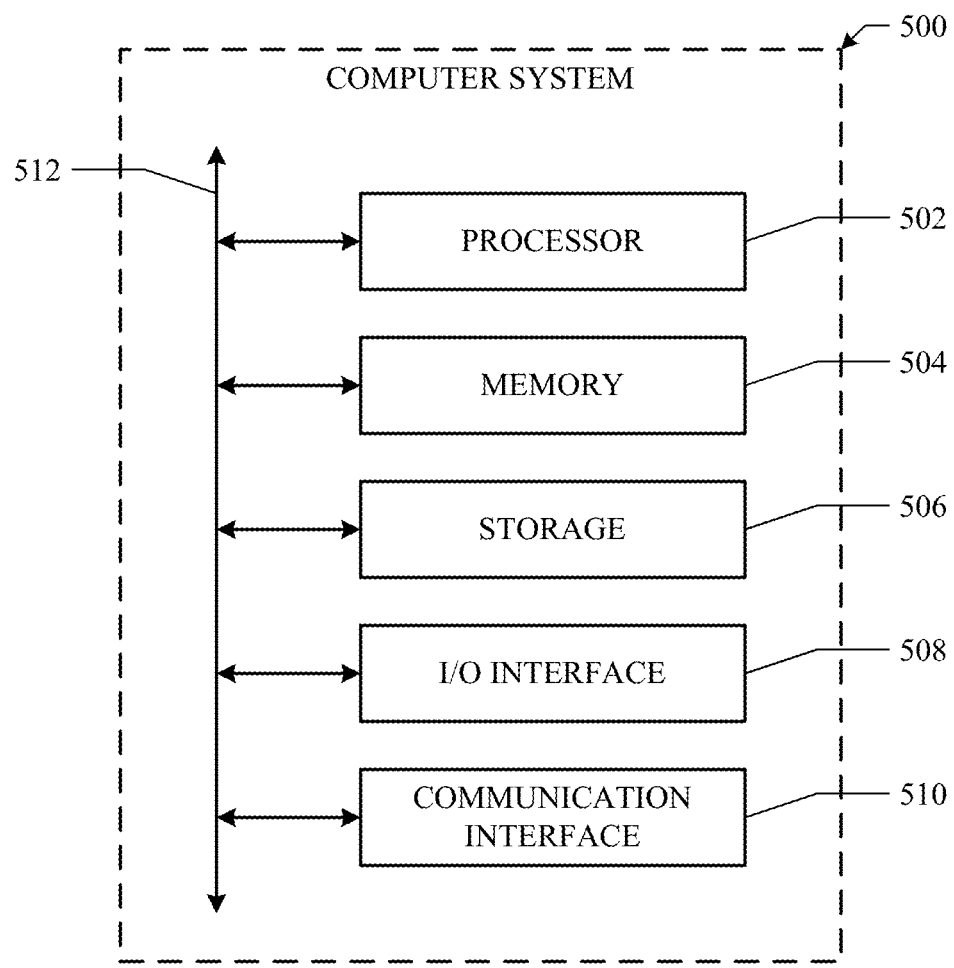
FIG. 5 is a block diagram of an example computer system.

FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, another mobile computing device, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   by a computing server of an online system, receiving a device key uniquely identifying a client device associated with a user, wherein:
      the device key is a derivative of a device identifier encoded in hardware of the client device; and
      the device key is stored in a data store associated with the client device and in a data store associated with the computing server;
   by the computing server, receiving a request from the client device comprising a user action on the online system;
   by the computing server, determining that the request requires user authentication at the online system;
   by the computing server, sending information to a user to request authentication based on the device key;
   by the computing server, receiving a first authentication code generated using a first cryptographic hash algorithm executed by the client-device based on the device key; and
   by the computing server, determining whether the user is authenticated based on the first authentication code and a second authentication code generated using a second cryptographic hash algorithm executed by the computing server based on the device key, wherein the second cryptographic hash algorithm is identical to the first cryptographic hash algorithm.

2. The method of claim 1, further comprising:
   maintaining, at an online system, a user account associated with the user;
   receiving the device key at the online system;
   storing, in a data store associated with the online system, the device key associated with the user, the device key being stored in association with the user account; and
   generating the second authentication code based on the stored device key.

3. The method of claim 2, wherein receiving the device key comprises receiving information entered by a user interface or receiving information sent by the computing device.

4. The method of claim 1, further comprising:
   sending, to the online system, information identifying the user;
   receiving, from the online system, at a third-party system, the second authentication code; and
   wherein the determining whether the user is authenticated comprises determining, by one or more processors associated with the third-party system, whether the user is authenticated.

5. The method of claim 1, wherein the device key comprises a cryptographic hash based on the device identifier.

6. The method of claim 5, wherein the cryptographic hash is based on a combination of the device identifier and information associated with the user.

7. The method of claim 6, wherein the information associated with the user comprises a username or password.

8. The method of claim 1, wherein an authentication code comprises a cryptographic hash based on the device key.

9. The method of claim 8, wherein the cryptographic hash is based on a combination of the device key and a timestamp.

10. The method of claim 1, further comprising:
    providing information to display a provisioning interface to the user, the provisioning interface instructing the user to use the computing device associated with the user to generate a device key.

11. The method of claim 10, further comprising:
    receiving the device key, wherein the device key is sent from the computing device or by information provided using the provisioning interface.

12. The method of claim 1, wherein the information to request authentication comprises information to display an authentication user interface, the authentication interface instructing the user to use the identified computing device to generate an authentication code.

13. The method of claim 12, further comprising:
    receiving the first authentication code, wherein the first authentication code is sent from the computing device or by information provided using the provisioning interface.

14. A computing device comprising:
one or more processors; and
a memory coupled to the processors comprising instructions executable by the processors, the processors operable when executing the instructions to:
generate a device key uniquely identifying the computing device in association with a user, the device key being derivative of a device identifier encoded in hardware of the computing device;
store the device key in a data store associated with the computing device;
send the device key to one or more computer servers of an online system, wherein the device key is stored in a data store associated with the one or more computer servers;
send a request for a user action to the online system;
receive, from the online system, a request for an authentication code; and
provide an authentication code generated using a cryptographic hash algorithm executed by the computing device based on the device key.

15. The device of claim 14, wherein the device key comprises a cryptographic hash based on the device identifier.

16. The device of claim 15, wherein the cryptographic hash is based on a combination of the device identifier and a username or password associated with the user.

17. The device of claim 14, wherein an authentication code comprises a cryptographic hash based on a combination of the device key and a timestamp.

18. The device of claim 14, the processors being further operable to:
receive a disavowal request;
send the disavowal request to the one or more computer servers; and
delete the device key stored in the data store associated with the computing device.

19. A system comprising:
one or more processors associated with one or more computer servers of an online system; and
a memory coupled to the processors comprising instructions executable by the processors, the processors operable when executing the instructions to:
receive a device key uniquely identifying a client device associated with a user, wherein:
the device key is a derivative of a device identifier encoded in hardware of the client device; and
the device key is stored in a data store associated with the client device and in a data store associated with the system;
receive a request from the client device comprising a user action on the online system;
determine that the request requires user authentication on the online system;
send information to a user to request authentication based on the device key;
receive a first authentication code generated using a first cryptographic hash algorithm executed by the client device based on the device key; and
determine whether the user is authenticated based on the first authentication code and a second authentication code generated using a second cryptographic hash algorithm executed by the system based on the device key, wherein the second cryptographic hash algorithm is identical to the first cryptographic hash algorithm.

20. The system of claim 19, wherein the device key comprises a cryptographic hash based on a combination of the device identifier and a username or password associated with the user, and wherein an authentication code comprises a cryptographic hash based on a combination of the device key and a timestamp.

* * * * *